United States Patent [19]

Parulski et al.

[11] Patent Number: 5,440,401
[45] Date of Patent: Aug. 8, 1995

[54] IMAGE DATABASE INCORPORATING LOW RESOLUTION INDEX IMAGE DATA

[75] Inventors: Kenneth A. Parulski, Rochester; Stephen H. Kristy, Fairport; Donald E. O'Brien, Holcomb, all of N.Y.

[73] Assignee: Eastman Kodak Company, Rochester, N.Y.

[21] Appl. No.: 583,063

[22] Filed: Sep. 14, 1990

[51] Int. Cl.[6] .............................................. H04N 5/76
[52] U.S. Cl. ...................................... 358/342; 358/335
[58] Field of Search .............. 358/335, 341, 342, 343, 358/102, 403, 133, 451, 261.3; 360/32, 33.1; 340/728; 382/47, 56; 395/137, 159; H04N 5/76, 5/85

[56] References Cited

U.S. PATENT DOCUMENTS

| | | | |
|---|---|---|---|
| 4,302,776 | 11/1981 | Taylor et el. | 358/160 |
| 4,364,084 | 12/1982 | Akimoto et al. | 358/76 |
| 4,482,924 | 11/1984 | Brownstein | 358/302 |
| 4,498,081 | 2/1985 | Fukushima et al. | 340/793 |
| 4,503,469 | 3/1985 | Kato | 358/287 |
| 4,506,300 | 3/1985 | Fearnside | 358/225 |
| 4,554,591 | 11/1985 | Kee | 358/256 |
| 4,603,966 | 8/1986 | Brownstein | 355/45 |
| 4,616,926 | 10/1986 | DiPietro et al. | 355/45 |
| 4,649,380 | 3/1987 | Penna | 340/750 |
| 4,686,580 | 8/1987 | Kato et al. | 358/287 |
| 4,691,238 | 9/1987 | Yamada | 358/280 |
| 4,694,354 | 9/1987 | Tanaka et al. | 358/102 |
| 4,714,962 | 12/1987 | Levine | 358/209 |
| 4,751,507 | 6/1988 | Hama et al. | 340/721 |
| 4,760,458 | 7/1988 | Watanabe et al. | 358/256 |
| 4,763,208 | 8/1988 | Kawamura et al. | 358/335 |
| 4,782,390 | 11/1988 | Hayashi et al. | 358/76 |
| 4,797,712 | 1/1989 | Hayashi et al. | 355/38 |
| 4,802,019 | 1/1989 | Harada et al. | 358/335 |
| 4,805,039 | 2/1989 | Otake et al. | 358/335 |
| 4,808,987 | 2/1989 | Takeda et al. | 340/721 |
| 4,809,064 | 2/1989 | Amos et al. | 358/76 |
| 4,812,998 | 3/1989 | Maeda | 364/518 |
| 4,833,625 | 5/1989 | Fisher et al. | 364/518 |
| 4,857,994 | 8/1989 | Belmares-Sarabia et al. | 358/22 |
| 4,907,095 | 3/1990 | Komura et al. | 358/451 |
| 4,933,773 | 6/1990 | Shiota et al. | 358/302 |
| 4,935,809 | 6/1990 | Hayashi et al. | 358/76 |
| 4,951,132 | 8/1990 | Nakade et al. | 358/78 |
| 4,963,992 | 10/1990 | Doi et al. | 360/32 |
| 4,965,662 | 10/1990 | Shiota | 358/78 |
| 4,966,285 | 10/1990 | Otake et al. | 206/455 |
| 4,969,204 | 11/1990 | Melnychuck et al. | 358/133 |
| 4,982,292 | 1/1991 | Itoh et al. | 358/426 |
| 4,991,004 | 2/1991 | Hayashi et al. | 358/76 |
| 4,992,887 | 2/1991 | Aragaki | 358/403 |
| 5,027,110 | 6/1991 | Chang et al. | 340/731 |
| 5,031,053 | 7/1991 | Chamzas et al. | 358/133 |
| 5,047,868 | 9/1991 | Takeda et al. | 358/335 |
| 5,050,003 | 9/1991 | Horii et al. | 358/342 |
| 5,218,455 | 6/1993 | Kristy | 358/403 |

OTHER PUBLICATIONS

W. G. Connolly et al (Article) "The Electronic Still Store–A Digital System For The Storage And Display Of Still Pictures".

*Primary Examiner*—Tommy P. Chin
*Assistant Examiner*—Huy Nguyen
*Attorney, Agent, or Firm*—Edward Dugas

[57] ABSTRACT

A mechanism for controlling the manner in which digitized image data files are stored on a digital data storage medium, such as a compact disc, in an opto-electronic image digitizing system in which a plurality of images that have been captured on an image storage medium, such as 35 mm film, are converted into a digital image representation and stored as respective high resolution image-representative data files. For each high resolution image-representative data file, an associated low resolution digitized image is stored within a low resolution index image data file. Selected ones or all of the low resolution image-representative data files within the index file may be read out and displayed as corresponding low resolution portions of a montage image to facilitate rapid viewing of the images.

16 Claims, 5 Drawing Sheets

(PRIOR ART)

IMAGE DATABASE INCORPORATING LOW RESOLUTION INDEX IMAGE DATA

FIELD OF THE INVENTION

The present invention relates in general to digital image processing systems and is particularly directed to a mechanism for facilitating the selection of stored images by storing an index image data file containing a low resolution digitized image of each of a plurality of respectively different higher resolution digitized images.

BACKGROUND OF THE INVENTION

Digital imaging systems, such as those employed for converting still color photographic slides into digital format for display on a color television monitor, customarily encode the output of an electronic imaging device, such as an opto-electronic film scanner, to some prescribed resolution and store in an associated database a separate image file for each film image. In many imaging system applications involving the storage of a large number of images, a key consideration is how easily a user can locate a particular image of interest out of all the images in the database. When the use wishes to review a particular stored image, the images are customarily called up from the database, one at a time, until the image of interest has been located. Obviously, such a search and locate scheme is very operator intensive and time consuming, especially for very high resolution images (e.g. 2K×3K pixel arrays resolved to eight or sixteen bits per color per pixel) which require very large data files. To simplify this task, the U.S. Patent to Taylor et al, U.S. Pat. No. 4,302,776 describes a readout and display system through which a plurality of reduced size pictures may be displayed in a single video frame by compressing the size of the plural images (subsampling the images) as they are called up from the database and displaying those plural images as a 'browse' montage of miniature pictures. Unfortunately, because the system of Taylor et al stores the digitized images as relatively high resolution data files and requires a subsampling operation for each of these files in the course of generating and displaying the browse montage, it is still relatively slow and requires substantial memory. This is a particular problem for databases containing very high resolution images. What is needed is a technique for creating a browse montage which is faster and simpler.

SUMMARY OF THE INVENTION

The inventors of the present invention have recognized that the selection of high resolution images from a large image database can be accomplished more quickly and easily if the image data is preprocessed and stored so as to facilitate rapid access of subsampled versions of the high resolution image data. In accordance with the present invention, the computation and data storage required to create a "browse" or "index" montage of miniature pictures are greatly simplified compared to conventional digital imagery processing systems, such as that described in the above-referenced Taylor et al patent. In accordance with the present invention, the selection of images from the database is facilitated by storing in the same database as the high resolution images, but as a data file that is separate from each of the plurality of high resolution image-representative data files, an index data file. This index data file contains a plurality of low resolution image-representative data files, one for each of the plurality of high resolution image-representative data files. Because the index data file contains a 'subsampled copy' of each of a plurality of images, for example those derived from a set of twenty-four color film exposures, browsing through a stored 'box of slides' to locate a particular image is readily accomplished by displaying only a single file—the index file, thereby providing the viewer with a montage of miniature images by accessing only a single file. Because the index image data needed to create the montage is stored in a single contiguous data file, rather than in a plurality of large, high resolution image files, the time required to access the data needed for the montage of miniature pictures is reduced significantly. Moreover, it is possible to quickly access the low resolution images and display them one at a time, rapidly one after the other, as an alternative way of locating a desired image.

Accompanying each low resolution image within the index file is an identifier that points to its associated high resolution image file, so that the viewer may readily call up and display the high resolution image associated with the selected low resolution image. This database access feature of the present invention is particularly useful in photofinishing applications where a customer may provide the photofinisher with a portable digital storage medium, such as a compact disc, that contains a large number of color film image files. The fact that the disc also contains an index file for plural high resolution images greatly speeds up the process of locating a particular file for a requested photofinishing operation.

DETAILED DESCRIPTION

Before describing in detail the particular low resolution index image data file storage and retrieval mechanism in accordance with the present invention, it should be observed that the present invention resides primarily in a novel structural combination of conventional image data processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the drawings do not necessarily represent the mechanical structural arrangement of the exemplary system, but are primarily intended to illustrate the major structural components of the system in a convenient functional grouping, whereby the present invention may be more readily understood.

Figure 1:
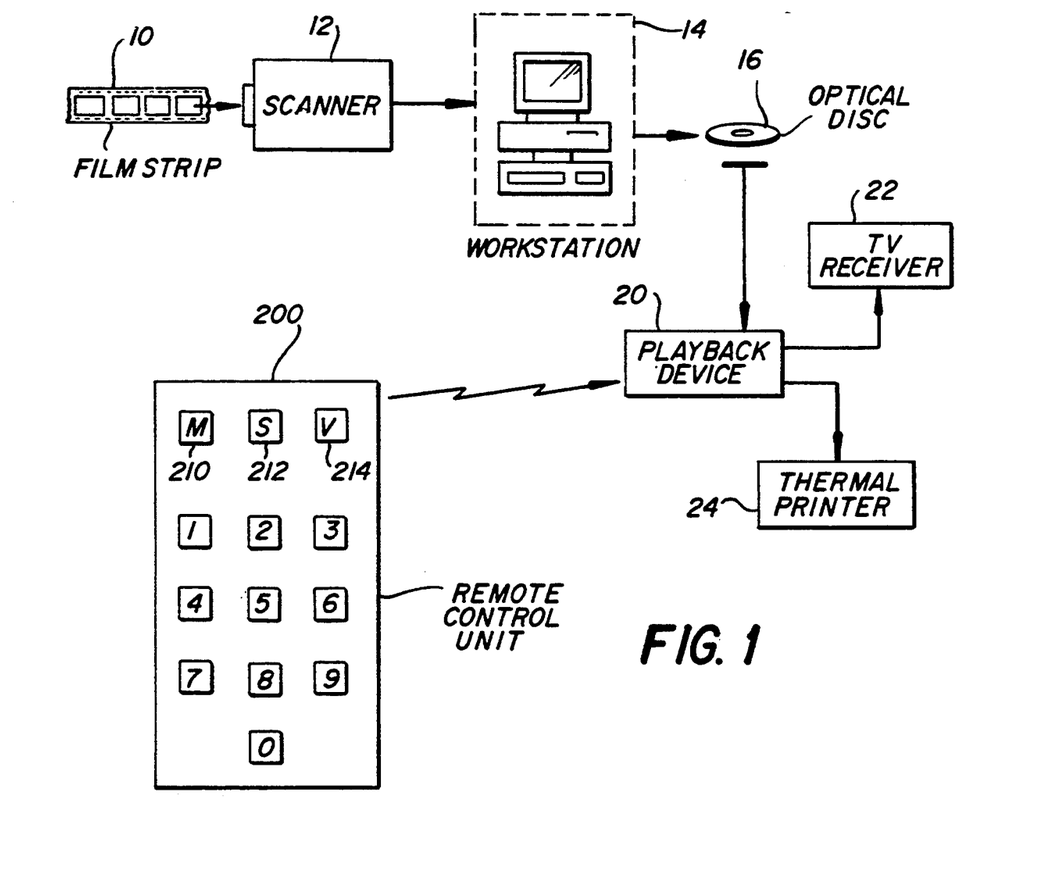
FIG. 1 diagrammatically illustrates a photographic color film digital imaging system in which the present invention may be employed.

FIG. 1 diagrammatically illustrates a photographic color film digital imaging processing system in which the present invention may be employed. For purposes of the present description such a system may be of the type described, for example, in co-pending patent application Ser. No. b 582,305, filed Sep. 14, 1990, by S. Kristy, now U.S. Pat. No. 5,218,455, entitled "Multiresolution Digital Imagery Photofinishing System", assigned to the assignee of the present application and the disclosure of which is incorporated herein. However, it should be observed that the system described in the above-referenced co-pending application is merely an example of one type of system in which the invention may be used and is not to be considered limitative of the invention. In general, the invention may be incorporated in any digital image processing system.

In accordance with the digital image processing system of FIG. 1, photographic images, such as those captured on 35 mm negatives 10, are scanned by a high resolution optoelectronic film scanner 12, such as a commercially available Eikonix Model 1435 scanner. Scanner 12 outputs digitally encoded data representative of the response of the photosensitive elements of its image sensing array onto which the photographic image contained on a respective color negative is projected. This digitally encoded data, or 'digitized' image, is coupled via a raster image digital data stream to an attendant image processing workstation 14, which contains a frame store and image processing application software through which the digitized image may be processed (e.g. enlarged, sharpened, cropped, subjected to scene color-balance correction, etc.) to achieve a desired image appearance. Once this high resolution image has been prepared, it is written onto a transportable, digital data recording medium, such as a write-once optical compact disc 16, for subsequent playback on an optical disc playback device (CD player) 20, which can be connected to a relatively moderate resolution consumer television receiver 22, or a high resolution thermal color printer 24, such as a Model XL-7700 printer manufactured by the assignee of the present application. CD player 20 may controlled by a (handheld) remote control unit 26, control buttons of which are associated with reproduction (e.g. display) functions of the associated output device (television receiver) and coupled preprogrammed control inputs in the manner to be described below for initiating the call up and display of digital data recorded on an optical compact disc.

In accordance with the image data processing system described in the above referenced co-pending Kristy application, each captured image is stored as a respective high resolution image data file composed of a low resolution image bit map file and a plurality of residual images associated with respectively different degrees of image resolution. By iteratively combining successive residual images with the low resolution image, successively higher resolution images may be recovered from the low resolution image for application to a readout device such as a color monitor display or hard copy printer.

Figure 4:
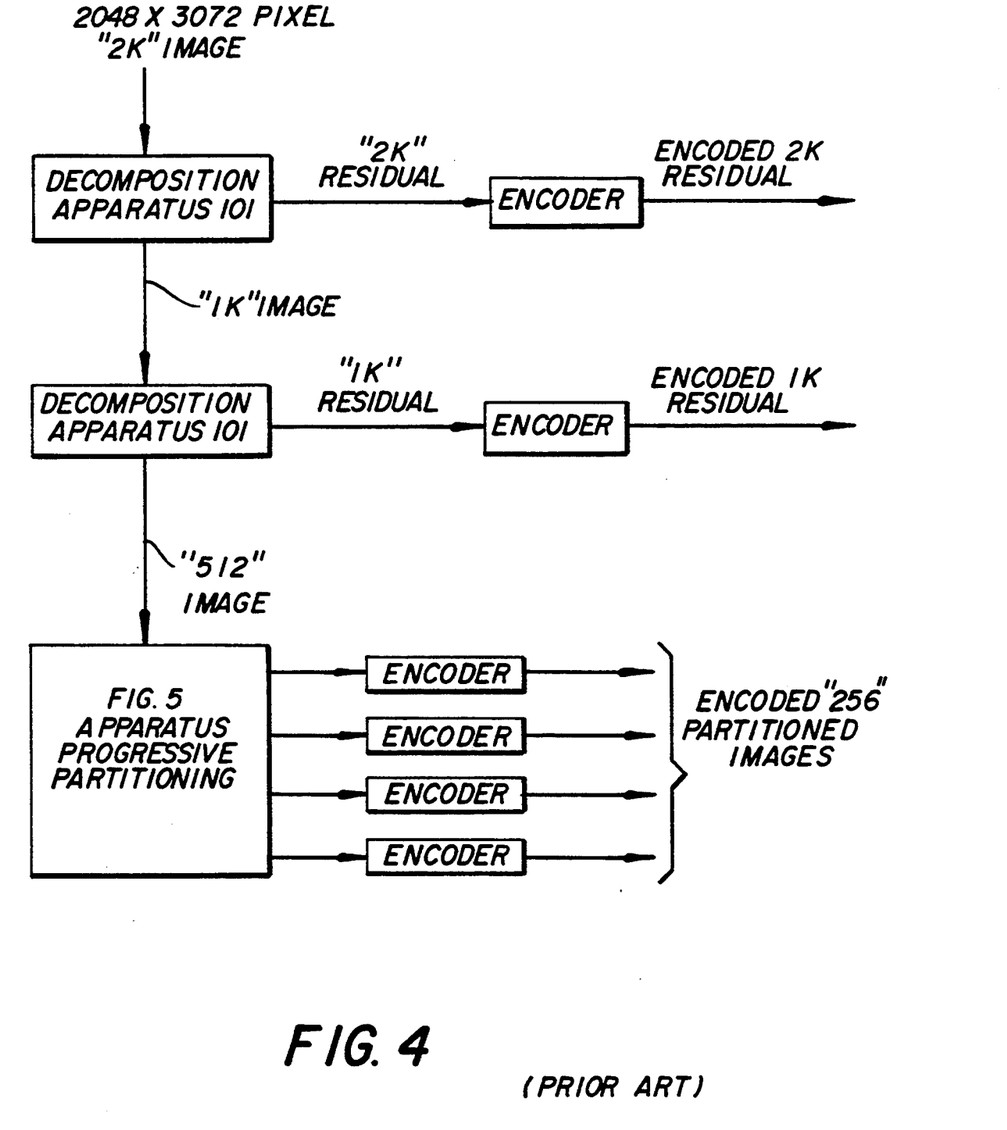
FIGS. 4-6 diagrammatically illustrate a scheme for providing partitioned low resolution bit mapped images and encoded high resolution residual image files.
Figure 5:
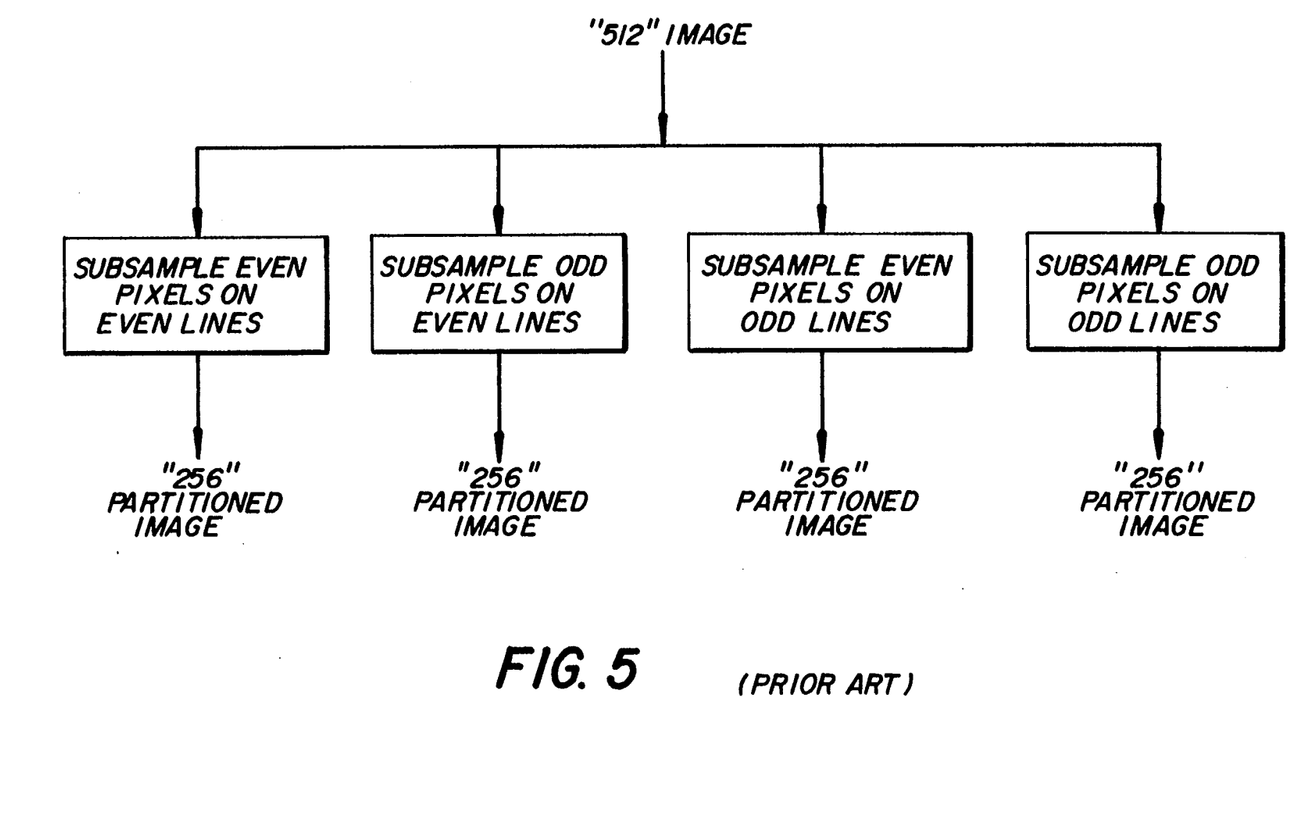
Figure 6:
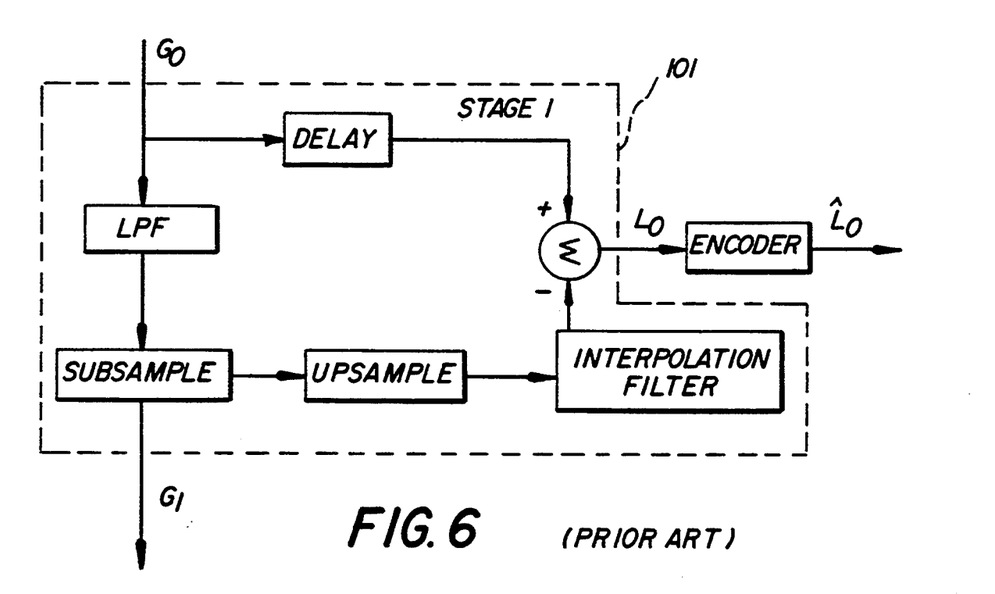

FIGS. 4, 5 and 6 depict a digitized image data storage and retrieval method, described in U.S. Pat. No. 4,969,204, issued: Nov. 6, 1990, by Paul Melynchuck et al, entitled "A Hybrid Residual-based Hierarchical Storage and Display Method for High Resolution Digital Images in a Multiuse Environment" assigned to the assignee of the present application and the disclosure of which is herein incorporated. Pursuant to this method, from a 2048×3072 pixel high resolution image, four progressively partitioned 256×384 bit mapped images together with encoded "1K" and "2K" residual image files are formed. The 2K residual, 1K residual and the four 256×384 partitioned images together constitute a high resolution image file. The first of the four 256×384 partitioned images, where the 512×768 image is subsampled using even pixels on even lines, constitutes the low resolution image record. The present invention uses a separately stored copy of the low resolution record of each image, grouped together in an index image file, to speed up and simplify the task of locating images in the database.

Figure 2:
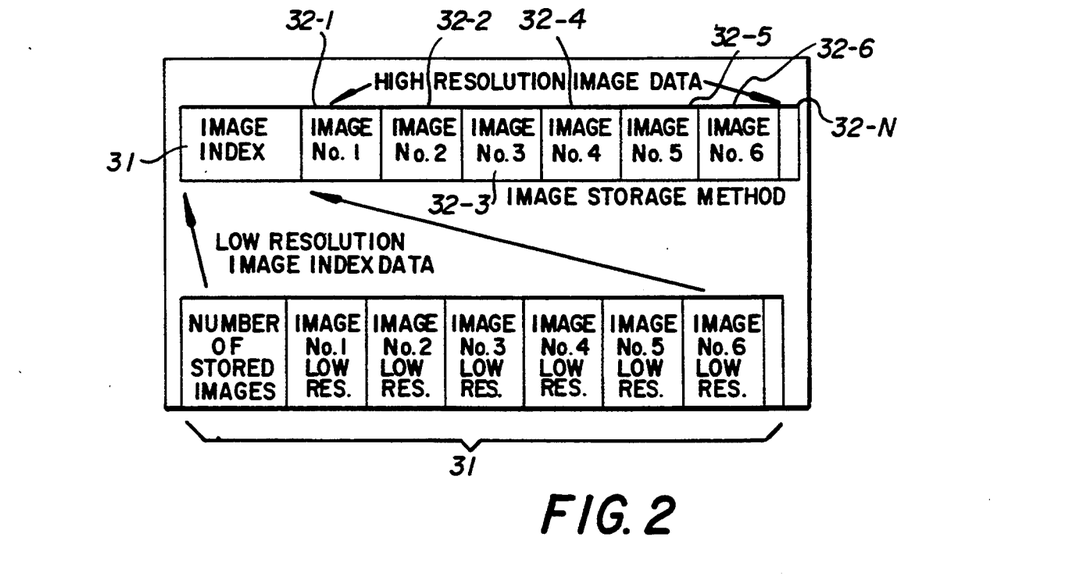
FIG. 2 diagrammatically shows an image index data file into which low resolution images of each of subsequent image files are duplicated in the course of digitizing and recording a set of photographic color images as low resolution and associated residual images.

As pointed out briefly above, pursuant to the present invention, in addition to writing, onto the disc, a respective high resolution image data file that has been formatted as four partitioned bit-mapped files and a pair of residual files for each digitized image, the image processing system of FIG. 1 generates and stores a separate index image file that contains a copy of the low resolution images (that is, one of the four partitioned, bit-mapped images) of each of a plurality of image data files. This storage mechanism is diagrammatically illustrated in FIG. 2 as an image index data file 31, which is preferably written so as to be the first file accessed by playback device 20 shown in FIG. 1, into which the low resolution digitized images of each of subsequent image files 32-1 . . . 32-N are duplicated in the course of the digitizing and recording of a set of color photographic images. Image files 32-1 . . . 32-N are high resolution image files, in that they contain all the information that is necessary to produce high resolution images. On the other hand, image index data file 31 is a low resolution image file and contains a copy of each of the low resolution digitized images within files 32-1 . . . 32-N. Each low resolution image within file 31 has an identification field referencing a respective one of files 32-1 . . . 32-N. The low resolution images within file 31 may be directly read out without residual processing as a composite image, thereby providing the viewer with substantially immediate access to a plurality of images, or they may be accessed one at time in rapid succession, to facilitate locating of a particular image.

Using the signal processing architecture of FIG. 3 to be described below, a montage of images may be displayed on TV receiver 22, when the disc 16 is first inserted into the playback device 20, or when the user presses the montage button 210 on playback device remote control unit 26. All of the images on the disc are then displayed, either as a single montage or a set of montages, along with numerical text to indicate image numbers. The user then presses the appropriate image numbers 220 on remote control unite 26 in order to instruct the player to display the desired full screen image. Alternatively, the user may press the scan button 212 to instruct playback device 20 to rapidly display the individual low resolution images from the image index file, one at a time, in rapid succession. When the desired picture is displayed, the user presses the "view" button, which instructs the playback device to retrieve and display the corresponding full resolution image.

Figure 3:
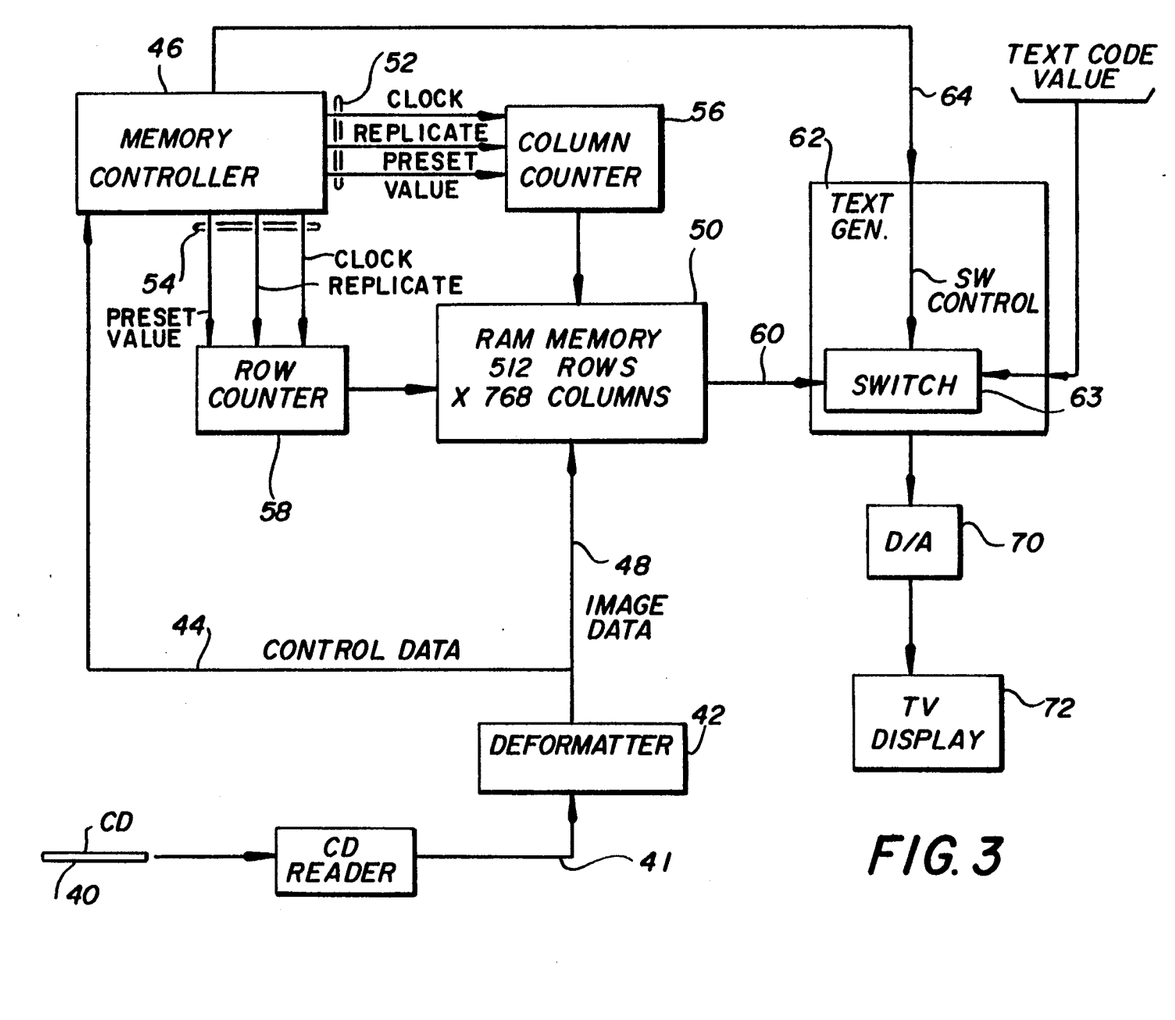
FIG. 3 diagrammatically illustrates the signal processing architecture of an image retrieval mechanism in accordance with the present invention.

FIG. 3 diagrammatically illustrates the signal processing architecture of an image retrieval mechanism in accordance with the present invention, which may be incorporated in a commercially available digital data storage and retrieval device, such as the compact disc player of FIG. 1, for supplying video signals to an associated display device, such as a color television monitor. As shown in FIG. 3, data read from a disc 40 is coupled over input bus 41 to a deformatter 42, which separates "header" control data (indicating the start of a new image file and the image number) from the image data. The header data is coupled over link 44 to a memory controller 46, while the image data is coupled over link 48 to a random access memory 50, the storage capacity of which corresponds to the total size of the four encoded 256×384 partitioned images (512×768) stored on the disc.

Memory controller 46 may be incorporated as part of the CD player's microcontroller or may be a separate dedicated combinational logic circuit driven by the microcontroller for controlling the generation of read out address/clock signals which are supplied over respective address bus links 52 and 54 to a set of associated column and address counters 56 and 58, respectively, for controlling the rate and order in which the contents of memory 50 are accessed.

Specifically, the "clock" signal lines allow counters 56 and 58 to be incremented, the "preset" lines allow the counter to be preset to the value indicated, and the "replicate" line allow the address of column counter 56 to be incremented every second time that the clock line is asserted, rather than every time it is asserted, in order to display a full screen video image from a low resolution 256×384 pixel image record.

When image data is read out from memory, it is coupled over link 60 to a text generator which optionally and controllably substitutes for the pixel code values accessed from memory 50 an alternate code value, representative of a prescribed text color (e.g. white). A multiplexer switch 63 allows the D/A converter 70 to either receive the pixel code values from memory 50, or instead to receive the "text" code value. The position of multiplexer switch 63 is controlled by control signals on link 64 from memory controller 46 in such a manner as to overlay numbers corresponding to the image numbers of the images being displayed from disc 40. The resulting combined image and text data is then output to a digital-to-analog converter 70 for application to a display device, such as a color TV monitor, so that a reproduction of the original 35 mm image will be presented to the viewer.

Figure 7:
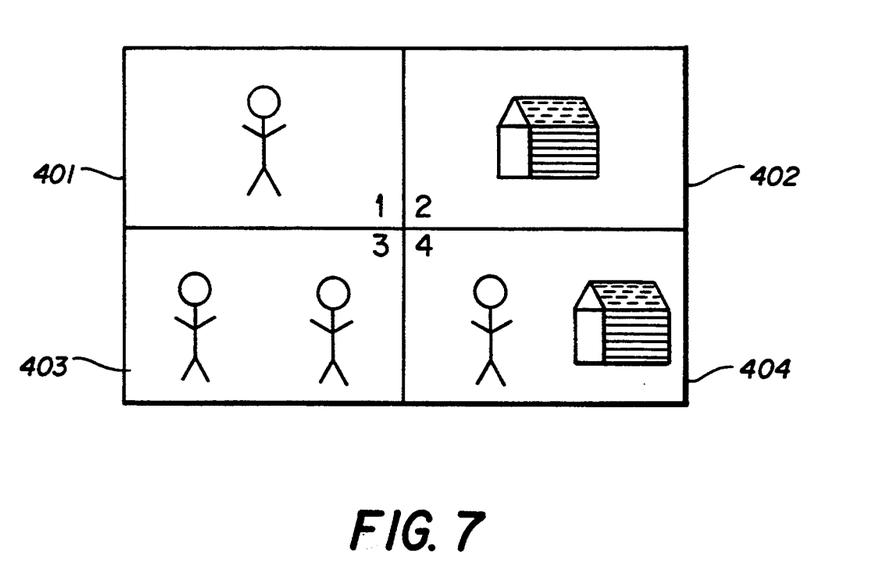
FIG. 7 illustrates a montage of four images with overlaid image numbers.

When the montage button 210 (FIG. 1) is pressed by the user, the CD reader moves to the index file data track and reads some of the data from the index image records into memory. Depending on the number of stored images indicated by the index file 31 (FIG. 2), either a single montage, or a plurality of montage images, may be stored into memory 50. In order to produce a montage of up to four images, as diagrammatically illustrated in FIG. 7, the four 256×384 low resolution records are read into memory 50 in such a manner that the first image 401 is placed in the upper left corner, the second image 402 is placed in the upper right corner, the third image 403 is placed in the lower left corner and the fourth image 404 is placed in the lower right corner. Text generator 62 overlays the numbers of the four images in the appropriate locations. Because the data for these four images is all stored together in index image file 31 shown in FIG. 2, the montage is created much faster than if the low resolution image information had to be retrieved from the four high resolution files 32-1, 32-2, 32-3 and 32-4, since the time required by the CD reader to access these four files is four times as long as the time required to access the single index image file.

To produce a montage with up to 16 images, the data from the low resolution index image record is subsampled by a factor of two to one both vertically and horizontally, (that is, every second pixel and every second line is discarded by deformatter 42) before being stored in memory 50. Thus, memory 50 stores a montage of sixteen 128×192 pixel images. If the disc contains more than sixteen images, the first sixteen images are displayed the first time the montage button is pressed. When the user presses the montage button a second time, the next sixteen images are displayed in a second montage, and so on until all images have been presented.

When the scan button 212 is pressed, the CD reader moves to the index file data track and reads the 256×384 pixel image data from the first index image record into memory 50. The memory controller 46 instructs column counter 56 and row counter 58 to replicate each pixel of the index image record for two pixel periods and two line periods, in order to display a full screen, but relatively low resolution, image. As the first index image record is being displayed, the second index image record is read from the disc to a second portion of memory 50. Once the second image has been read from the disc, it is displayed while a third image is read from the disc and written into memory 50, overwriting the data from the first image. In this manner, all of the images in the index image file 31 (FIG. 2) can be rapidly displayed on the TV display 72 of FIG. 3, at a rate of approximately one per second. Once the user observes the desired image, view button 214 is pushed, to instruct the CD reader to move to the appropriate high resolution image record 32-n, where n is the number of the selected image. The CD reader reads the four encoded 256×384 partitioned images from the high resolution image file into memory 50, so that the full resolution video image can be displayed.

As noted earlier, the index file feature of the present invention is also useful in photofinishing applications, where a customer may provide the photofinisher with a compact disc containing a large number of color film image files. Since the index image file contains the low resolution images, the index file may be used to rapidly print a montage image on thermal printer 24.

As will be appreciated from the foregoing description, the present invention substantially reduces the computational intensity and database storage requirements of conventional digital image display, such as that described in the previously referenced Taylor et al patent, by storing, in the same database that contains high resolution images, a low resolution index data file that is separate from each of the plurality of high resolution image-representative data files. Because the index data file contains a copy of the low resolution portion of each of the high resolution image files, browsing through a stored image set to locate a particular image is readily accomplished by retrieving and displaying only a single file—the index file, thereby immediately providing the viewer with a montage of miniature images from a single file. This database access feature of the present invention is particularly useful in photofinishing applications where a customer may provide the photofinisher with a portable digital storage medium such as a compact disc, that contains a large number of color image files.

While what has been shown and described is one embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of storing a plurality of digitized images comprising the steps of:
    (a) providing each digitized image of said plurality of digitized images as a respective multi-spatial resolution digital image file, said multi-spatial resolution digital image file containing plural digital images corresponding to said each digitized image and having respectively different spatial resolutions, the plural digital images of a respective multi-spatial resolution digital image file containing a first digital image having a first spatial resolution and a second digital image having a second spatial resolution lower than said first spatial resolution;
    (b) storing each multi-spatial resolution digital image file provided in step (a) at first respective storage locations of a digital data storage medium; and
    (c) storing, in a second storage location of said digital data storage medium, which second storage location is separate from said first respective storage locations thereof, a separate image index file which contains a duplicate copy of each of the second digital images contained in said multi-spatial resolution image files.

2. A method according to claim 1, wherein said digital data storage medium comprises a portable write once optical compact disc.

3. A method according to claim 1, wherein said digital data storage medium comprises a portable digital data storage medium.

4. A method according to claim 3, wherein said portable digital data storage medium comprises an optical compact disc.

5. A method according to claim 1, wherein step (a) comprises causing an opto-electronic scanner to scan a plurality of images that have been captured on a photographic image storage medium and thereby produce said plurality of digitized images, and processing each of said plurality of digitized images into a respective multi-spatial resolution digital image file containing plural digital images having said respectively different spatial resolutions.

6. A process for storing and retrieving a plurality of digitized images for display on an output display device comprising the steps of:
    (a) providing each digitized image of said plurality of digitized images as a respective multi-spatial resolution digital image file, said multi-spatial resolution digital image file containing plural digital images corresponding to said each digitized image and having respectively different spatial resolutions, the plural digital images of a respective multispatial resolution digital image file containing a first digital image having a first spatial resolution and a second digital image having a second spatial resolution lower than said first spatial resolution;
    (b) storing each multi-spatial resolution digital image file provided in step (a) at first respective storage locations of a digital storage medium;
    (c) storing, in a second storage location of said digital storage medium, which second storage location is separate from said first respective storage locations thereof, a separate image index file which contains a duplicate copy of each of the second digital images contained in said multi-spatial resolution image files; and
    (d) accessing said image index file and reading out therefrom at least one duplicate copy of a respective second digital image contained therein for display by said output display device.

7. A method according to claim 6, wherein step (d) comprises accessing said image index file and reading out therefrom duplicate copies of respectively different second digital images contained therein for display by said output display device.

8. A method according to claim 6, wherein step (d) comprises accessing said image index file and reading out therefrom duplicate copies of respectively different second digital images contained therein and causing said read out duplicate copies to be displayed simultaneously on said output display device.

9. A process for storing and retrieving digitized images for display on an output display device comprising the steps of:
    (a) providing each of a plurality of digitized images as a respective multi-spatial resolution digital image file, said multi-spatial resolution digital image file containing plural digital images corresponding to said each digitized image and having respectively different spatial resolutions, the plural digital images of a respective multi-spatial resolution digital image file containing a first digital image having a first spatial resolution and a second digital image having a second spatial resolution lower than said first spatial resolution;
    (b) coupling a transportable digital data storage medium to a digital image recording device and causing said digital image recording device to store each multi-spatial resolution digital image file provided in step (a) at first respective storage locations of a transportable digital data storage medium;
    (c) storing, in a second storage location of said transportable digital data storage medium, which second storage location is separate from said first respective storage locations thereof, a separate image index file which contains a duplicate copy of each of the second digital images contained in said multi-spatial resolution image files;
    (d) coupling said transportable digital data storage medium to a digital image read-out device and accessing said image index file stored in said transportable digital data storage medium so as to cause each duplicate copy of a second digital image contained therein to be read out therefrom and displayed by said output display device; and
    (e) accessing a selected one of said multi-spatial resolution image files stored by said transportable digital data storage medium and causing a first digital image contained therein to be displayed by said output display device.

10. A method according to claim 9, wherein said transportable digital data storage medium comprises a write once optical compact disc.

11. For use with a system for playing back digitized images by way of an output display device, a transportable digital data storage medium having stored at first respective storage locations thereof a plurality of respective multi-spatial resolution digital image files, each multi-spatial resolution digital image file containing respectively different spatial resolution versions of a respective one of a plurality of digitized images, said respectively different spatial resolution versions of a respective multi-spatial resolution digital image file containing a first digital image having a first spatial resolution and a second digital image having a second spatial resolution lower than said first spatial resolution, and wherein said transportable digital data storage medium has stored at a second storage location thereof, which second storage location is separate from said first respective storage locations thereof, a separate image index file which contains a duplicate copy of each of the second digital images contained in said multi-spatial resolution image files, so that when said transportable digital data storage medium is coupled to a digital image read-out device, said image index file stored in said transportable digital data storage medium is accessed to cause each duplicate copy of a second digital image contained therein to be read out therefrom and displayed by said output display device.

12. A transportable digital data storage medium according to claim 11, wherein said transportable digital data storage medium comprises a write once optical compact disc.

13. A system for storing and retrieving a plurality of digitized images for display on an output display device comprising:

a digital image processing unit which is operative to provide each digitized image of said plurality of digitized images as a respective multi-spatial resolution digital image file, said multi-spatial resolution digital image file containing plural digital images corresponding to said each digitized image and having respectively different spatial resolutions, the plural digital images of a respective multi-spatial resolution digital image file containing a first digital image having a first spatial resolution and a second digital image having a second spatial resolution lower than said first spatial resolution;

a digital image recording unit which is operative to store each multi-spatial resolution digital image file provided by said digital image processing unit at first respective storage locations of a transportable digital storage medium that has been coupled to said digital image recording unit, and to store, in a second storage location of said transportable digital storage medium, which second storage location is separate from said first respective storage locations thereof, a separate image index file which contains a duplicate copy of each of the second digital images contained in said multi-spatial resolution image files; and a digital image playback unit, to which said transportable digital data storage medium is coupled after being transported thereto from said digital image recording unit, said digital image playback unit being operative to access said image index file and read out therefrom at least one duplicate copy of a respective second digital image contained therein for display by said output display device.

14. A system according to claim 13, wherein said digital image playback unit is operative to access said image index file and read out therefrom duplicate copies of respectively different second digital images contained therein for display by said output display device.

15. A system according to claim 13, wherein said digital image playback unit is operative to access said image index file and read out therefrom duplicate copies of respectively different second digital images contained therein, thereby causing said read out duplicate copies to be displayed simultaneously on said output display device.

16. A system according to claim 13, wherein said transportable digital data storage medium comprises a write once optical compact disc.

* * * * *